ABSTRACT
United States Patent [19]

Monroe

[11] 4,386,170

[45] May 31, 1983

[54] CURABLE FLUORINATED SILICONE ELASTOMER

[75] Inventor: Carl M. Monroe, Midland, Mich.

[73] Assignee: Dow Corning Corporation, Midland, Mich.

[21] Appl. No.: 202,804

[22] Filed: Oct. 31, 1980

[51] Int. Cl.$^3$ .................. C08L 83/06; C08L 83/08
[52] U.S. Cl. ......................... 523/210; 523/213; 524/493; 524/433; 524/436; 525/102; 525/104
[58] Field of Search ........................ 525/102, 104; 260/37 SB; 523/210, 213

[56] References Cited

U.S. PATENT DOCUMENTS

| | | | |
|---|---|---|---|
| 2,710,290 | 6/1955 | Safford et al. | 260/41 |
| 2,927,908 | 3/1960 | Konkle et al. | 260/41 |
| 3,132,116 | 5/1964 | Wilkus | 260/41 |
| 3,192,175 | 6/1965 | Russell | 260/29.1 |
| 3,630,982 | 12/1971 | Matherly | 260/29.1 SB |
| 3,669,707 | 6/1972 | Donnelly et al. | 117/21 |
| 4,010,136 | 3/1977 | Blizzard et al. | 260/37 SB |

FOREIGN PATENT DOCUMENTS 567259 12/1958 Canada .
575889 5/1959 Canada .................. 525/102

*Primary Examiner*—Wilbert J. Briggs, Sr.
*Attorney, Agent, or Firm*—Roger H. Borrousch

[57] ABSTRACT

The resistance of a fluorinated silicone elastomer to the effects of exposure to hot fuel, hot oil, and elevated temperature has been improved by the addition of from 0.8 to 5 parts by weight of polytetrafluoroethylene powder to a curable fluorinated silicone elastomeric composition, consisting essentially of a fluorinated polydiorganosiloxane gum having from 45 to 50 percent of the organic radicals being 2-(perfluoroalkyl)ethyl radicals, from 50 to 55 percent of the organic radicals being monovalent hydrocarbon radicals with from 0.1 to 1 percent of the monovalent hydrocarbon radicals being aliphatic unsaturated radicals, and a treated reinforcing silica filler. The resistance is further improved by also including an alkaline earth metal oxide or hydroxide acid acceptor.

9 Claims, No Drawings

CURABLE FLUORINATED SILICONE ELASTOMER

BACKGROUND OF THE INVENTION

1. Field of the Invention

This invention relates to curable fluorinated silicone elastomeric compositions and method of production and use.

2. Description of the Prior Art

Safford and Bueche teach in U.S. Pat. No. 2,710,290, issued June 7, 1955, that a composition of matter comprising an organopolysiloxane convertable by heat to the cured, solid, elastic state, having monovalent hydrocarbon radicals, and a minor proportion of solid polytetrafluoroethylene can be mixed and then cured to an elastomer with improved physical properties, particularly tear strength. They teach their composition appears to have better hydrocarbon oil resistance and resistance to aromatic solvents than does the same composition without the polytetrafluoroethylene.

Polmanteer in Canadian Pat. No. 567,259, issued Dec. 9, 1958, discloses a composition comprising an organopolysiloxane, having monovalent hydrocargon radicals, polyfluorinated aliphatic monovalent hydrocarbon radicals and halogenated aromatic monovalent hydrocarbon radicals; from 5 to 100 parts by weight, based upon 100 parts by weight of the organopolysiloxane, of a powdered fluorocarbon and a vulcanizing agent. When the compositions were vulcanized, elastomeric materials were produced which had high tear resistance combined with low compression set. One of the fluorocarbon materials found suitable was polytetrafluoroethylene. The compositions were useful in the formation of gaskets and for other uses requiring combinations of high tear resistance, low compression set, excellent thermal stability, and chemcial inertness.

Konkle and Talcott teach in U.S. Pat. No. 2,927,908 issued Mar. 8, 1960, that the addition of polytetrafluoroethylene to fluorinated organopolysiloxane rubbers improves the tensile strength and tear resistance of the rubber. They teach that it was already known that small quantities of polytetrafluoroethylene in silicone rubber stocks improved the tear strength. At a fairly low proportion of polytetrafluoroethylene to previously employed organopolysiloxane stock, The tensile strength of the stock reached a peak, after which subsequent additions of polytetrafluoroethylene decreased the tensile strength, while still more was found to be incompatible. Konkle and Talcott found that when from 35 to 125 parts of polytetrafluoroethylene was added to a fluorinated organopolysiloxane containing rubber, a new peak in tensile strength was reached. Their compositions showed improved tensile and tear strengths and good resistance to solvents and fuels.

Polytetrafluoroethylene has been added to compositions containing fluorinated polydiorganosiloxanes to modify the characteristics of the uncured composition. Russel in U.S. Pat. No. 3,192,175, issued June 29, 1965, and Matherly in U.S. Pat. No. 3,630,982, issued Dec. 28, 1971, teach sealing compositions containing poly-3,3,3-trifluoropropylmethylsiloxane gum, reinforcing silica filler, poly-3,3,3-trifluoropropylmethyl siloxane fluid, and polytetrafluoroethylene resin. These sealant compositions require a particular range of viscosity, expressed as plasticity number in order to function properly in their application. The sealing compositions are noncuring. Blizzard and Monroe teach in U.S. Pat. No. 4,010,136, issued Mar. 1, 1977, that the addition of from 0.3 to 1.0 parts by weight of a polytetrafluoroethylene powder, based upon 100 parts by weight of polydiorganosiloxane gum and reinforcing silica filler, to a low durometer curable polydiorganosiloxane composition will reduce the amount of porosity or bubbles formed during the curing step. Their composition requires at least 95 percent of the organic radicals in the polydiorganosiloxane gum to be methyl radicals.

In U.S. Pat. No. 3,132,116, issued May 5, 1964, Wilkus teaches that organopolysiloxanes containing chemically combined organocyanoalkylsiloxane units are extremely tacky and are very difficult to process. Such polymers are more oil resistant than conventional polydimethylsiloxane. Wilkus shows that this processing problem is dramatically reduced if from 0.1 to 10 parts of polytetrafluoroethylene is included in the composition.

In his Example 1, Wilkus shows that compositions including polytetrafluoroethylene exhibited improved tensile strength. The resistance to surface reversion on exposure to Mil 7808 oil for 10 hours at 150° C. was also improved.

Donnelly et al. in U.S. Pat. No. 3,669,707, issued June 13, 1972, teach a fixing process in which a particulate thermoplastic toner contacts a silicone elastomer surface. One of the silicone elastomer gums suggested is a polymerized trifluoropropyl and vinyl dimethylpolysiloxane. The preferred fillers are fluorinated resins having surface energies below 30 dynes/cm with polytetrafluoroethylene being shown in the examples. The composition is substantially free of high surface energy fillers such as silica.

None of the above teachings suggest that the retention of physical properties of fluorinated polydiorganosiloxane elastomers after exposure to hot fuel and hot petroleum oil would be improved by adding polytetrafluoroethylene in amounts of 0.8 to 5 parts by weight, per 100 parts by weight of the combination of polydiorganosiloxane gum and reinforcing filler.

SUMMARY OF THE INVENTION

It was known that fluorinated silicone elastomers were useful in manufacturing items such as gaskets and diaphragms that were exposed in service to harsh environments such as fuel, petroleum oil, and hot air and gases in applications such as are found in automobile engines. Improved compositions were desired that would extend the useful life of such items.

The addition of small amounts of polytetrafluoroethylene powder to a curable fluorinated silicone elastomeric composition has been found to unexpectedly improve the retention of physical properties of the elastomer after exposure to hot fuel and hot oil immersion and to heat aging.

It has been found that the addition of from 0.8 to 5 parts by weight of polytetrafluoroethylene powder to 100 parts by weight of polydiorganosiloxane gum plus reinforcing filler yields a product which has improved resistance to the effects of hot fuel and hot oil immersion and of heat aging. Molded parts such as seals, gaskets, and diaphragms, manufactured from the improved composition, are useful in applications when they are exposed to hot fuel and hot oil.

It is an object of this invention to improve the resistance of fluorinated silicone elastomers to the effects of exposure to hot fuels, hot oil, and hot air.

DESCRIPTION OF THE INVENTION

This invention relates to a curable fluorinated silicone elastomeric composition consisting essentially of (a) 100 parts by weight of polydiorganosiloxane gum having from 45 to 50 percent of the organic radicals being 2-(perfluoroalkyl)ethyl radicals in which the perfluoroalkyl radical has from 1 to 4 inclusive carbon atoms, from 50 to 55 percent of the organic radicals being selected from the group consisting of monovalent hydrocarbon radicals having from 1 to 6 carbon atoms, from 0.1 to 1 percent of the monovalent hydrocarbon radicals having aliphatic unsaturation, (b) from 20 to 65 parts by weight of reinforcing silica filler having a surface area of at least 150 m$^2$/g, said silica being treated with anticrepe-hardening agent, (c) from 0.8 to 5 parts by weight, based on 100 parts by weight of (a) plus (b), of polytetrafluoroethylene powder, and (d) means for curing.

Elastomers based upon a polymer having a siloxane structure, R$_2$SiO, are known for their usefulness at very high and very low temperatures. It is also known that when a substantial proportion of the organic groups are fluorinated, the resulting polymer possesses improved resistance to the undesirable effects of exposure to hydrocarbon fuels and oils. Commercial products have been made available having about 50 percent of the organic groups being fluorinated, the fluorinated group usually being 3,3,3-trifluoropropyl. Such products are reinforced with a silica filler to give them useful physical properties and cured to yield elastomers. Now it has been found that the combination of a specified fluorinated polydiorganosiloxane gum, treated reinforcing silica filler, and a small amount of polytetrafluoroethylene powder yields a composition which, when cured, exhibits a retention of physical properties after exposure to hot fuel and hot petroleum oil that is significantly improved over that obtained when the polytetrafluoroethylene is absent. It is unexpected that the addition of such small amounts of polytetrafluoroethylene powder to a composition that is already highly fluorinated would result in a significant change in the hot fuel and hot petroleum oil resistance.

It has also been found that the heat resistance of such fluorinated silicone elastomers can be significantly improved by the addition of small amounts of polytetrafluoroethylene powder.

The improved retention of physical properties after exposure to hot fuel, hot petroleum oil, and hot air is shown by comparing the properties of the fluorinated silicone elastomer, such as durometer, tensile strength, and elongation, as cured and after exposure to the test environment. It is generally desirable that there be as little change in properties as possible, signifying that the fluorinated silicone elastomer will function properly in the presence of these harsh environments which are known for their ability to degrade the physical properties of elastomers.

The polydiorganosiloxane gum used in the composition of this invention consists essentially of linear siloxane chains of diorganosiloxane units in which the organic groups are selected from 2-(perfluoroalkyl)ethyl radicals and from monovalent hydrocarbon radicals having from 1 to 6 carbon atoms.

The perfluoroalkyl radical has from 1 to 4 inclusive carbon atoms. Useful perfluoroalkyl radicals include trifluoromethyl, perfluoroethyl, perfluoropropyl and perfluoroisobutyl radicals. The monovalent hydrocarbon radicals can be any monovalent hydrocarbon radical such as alkyl radicals such as methyl, ethyl, isopropyl, or hexyl; alkenyl radicals such as vinyl or allyl; and phenyl. The preferred 2-(perfluoroalkyl)ethyl radical is the 3,3,3-trifluoropropyl radical. The preferred monovalent hydrocarbon radical is the methyl radical. From 45 to 50 percent of the organic radicals must be fluorinated to impart maximum solvent and fuel resistance to the composition. From 0.1 to 1 percent of the monovalent hydrocarbon radicals have aliphatic unsaturation with the preferred unsaturated radical being the vinyl radical to assist in the proper cure of the composition. It is preferred that from 0.5 to 1.0 percent of the monovalent hydrocarbon radicals be vinyl radicals. The polydiorganosiloxane has a viscosity of greater than 1000 Pa·s so that it is of a gum-like consistency, preferably with a Williams plasticity number of greater than 250. The polymer is normally endblocked with hydroxyl groups. The preferred polymer is essentially a hydroxyl endblocked poly-3,3,3-trifluoropropyl(methyl)siloxane having from 0.25 to 0.5 percent vinyl radicals. Such polymers are commercially available.

The gum can be a single gum meeting the requirement of this invention, or it can be a blend of gums as long as the blend of gums meets the requirements of this invention. For example, the fluroinated silicone elastomeric composition can contain a small amount of polydiorganosiloxane gum not containing 2-(perfluoroalkyl)ethyl radicals such as the polydimethylsiloxane gum used as a carrier in many additives. The presence of polydiorganosiloxane gum not containing 2-(perfluoroalkyl)ethyl radicals causes the composition to have poorer retention of physical properties after exposure to fuel and petroleum oil than when the preferred poly-3,3,3-trifluoropropyl(methyl)siloxane gum is used.

The gum can be a blend of gums in which some of the gum contains aliphatic unsaturation and some of the gum does not. If a blend of gums is used, the blend must have an average of from 0.1 to 1 percent of the monovalent hydrocarbon radicals present as aliphatic unsaturated radicals.

The fluorinated silicone elastomeric composition must contain sufficient reinforcing silica filler or the cured elastomer will not have the required physical properties. The reinforcing silica filler can be any of the well known high surface area, finely divided silicas known as fume silicas and silica aerogels. In order to be reinforcing, the surface area must be over 150 m$^2$/g with the preferred surface area being from 200 m$^2$/g to over 400 m$^2$/g. Such silicas are well known in the art and are commercially available. The reinforcing silica filler is normally used at levels of 20 to 65 parts by weight of silica based upon 100 parts by weight of polydiorganosiloxane gum. The amount of reinforcing silica to be used depends to a large extent upon the hardness desired in the fluorinated silicone elastomer. For a hardness of 40 durometer, Shore A, an amount of about 20 parts based on 100 parts of polydiorganosiloxane gum may be appropriate. A hardness of 80 may require 65 parts of reinforcing silica filler. The other ingredients of the fluorinated silicone elastomeric composition also have an effect upon the hardness of the cured composition, so it is not possible to state the exact amount of reinforcing silica necessary to give a particular hardness. For instance, fluorinated silicone elastomers having a desirable hardness of about 75 durometer, Shore A, have been obtained using from about 45 parts to about 60 parts of reinforcing silica.

It is well known that if reinforcing silica filler is used in polydiorganosiloxane gum without further treatment, the gum and filler will react and become too stiff to be workable, a phenomenon known as crepe-hardening. Means of treating reinforcing silica with anticrepe-hardening agent to prevent this reaction are well known in the art. The reinforcing silica can be treated before addition to the fluorinated silicone elastomeric composition or the silica can be treated in situ during the mixing of the fluorinated silicone elastomeric composition.

Methods of preparing treated reinforcing silica are disclosed in U.S. Pat. No. 3,122,516, issued Feb. 25, 1969, to Polmanteer; U.S. Pat. No. 3,334,062, issued Aug. 1, 1967, to Brown and Hyde; U.S. Pat. No. 3,635,743, issued Jan. 18, 1972, to Smith; and U.S. Pat. No. 3,624,023, issued Nov. 30, 1977, to Hartage, which are hereby incorporated by reference to show the preparation of treated silica fillers.

The reinforcing silica can be treated in situ by adding anticrepe-hardening agents during the mixing of the fluorinated silicone elastomeric composition. Organosilicon compounds used as anticrepe-hardening agents may be low molecular weight silanes, siloxanes, or silazanes as is well known in the art. The organic groups of the organosilicon compound can be such groups as methyl, ethyl, phenyl, vinyl, or 3,3,3-trifluoropropyl. Organosilicon compounds which deposit on the surface of the silica filler triorganosiloxane units such as trimethylsiloxy units, vinyl dimethyl siloxy units, and dimethyl-3,3,3-trifluoropropylsiloxy units are useful. Organosilicon compounds which deposit short chain siloxane units on the surface of the silica filler are also useful. These short chain siloxanes may contain the same organic groups as shown above. The short chain siloxanes are typically endblocked with hydroxyl or alkoxy groups so that they may react with the hydroxyl groups present on the surface of the reinforcing silica filler when the filler and the anticrepe-hardening agent or agents are mixed together during the manufacture of the fluorinated silicone elastomeric composition. These siloxanes have a low molecular weight so that their viscosity is below 1 Pa·s at 25° C. They are typically used in ratios of from 1:1 to 5:1 based on parts by weight of reinforcing silica filler to parts by weight of siloxane. Preferred anticrepe-hardening agents for use in the instant invention are short chain length hydroxyl endblocked polydiorganosiloxane fluids containing 3,3,3-trifluoropropyl(methyl) siloxane units and hydroxyl endblocked polydiorganosiloxane fluids containing methylvinylsiloxane units, the fluids having a viscosity of about 0.1 Pa·s at 25° C. Benzene soluble, low molecular weight resins containing methylvinylsiloxane units are an alternate to the polydiorganosiloxane fluid containing methylvinylsiloxane units. The above types of organosilicon compounds are preferred as anticrepe-hardening agents as they are readily available and can be used in situ to treat the reinforcing filler, thus avoiding the additional step of producing a treated reinforcing filler. When sufficient organosilicon compound is used to yield from 0.075 to 0.60 parts by weight of vinyl radical, based on 100 parts by weight of polydiorganosiloxane gum, the physical properties of the fluorinated silicone elastomers are improved, both initially and after exposure to hot fuel, hot oil and hot air.

The polytetrafluoroethylene powder is the ingredient in the composition of this invention that makes the composition unique. The powder is a small particle size polytetrafluoroethylene commercially supplied as a molding resin to be used in powder metallurgy and ceramic molding techniques to form solid polytetrafluoroethylene molded parts. Suitable powders are commercially available, such as those sold by E. I. Dupont de Nemours of Wilmington, Del., under the trade names of Teflon ® 6C and Teflon ® 7A. Teflon 6C is described as a free-flowing white powder of tetrafluoroethylene polymer having an average particle size of 500 plus or minus 150 micrometers. It is intended for use in an extrusion process for producing such products as wire coating, wire jacketing and tubing. Teflon 7A is described as a small particle molding resin useful in processing techniques similar to those used in powder metallurgy. Teflon 7A has a particle size on the order of 35 micrometers. The particle size of the polytetrafluoroethylene is reported as being determined by the wet screen method described in ASTM-D-1457.

The unexpected improvement in retention of physical properties after exposure to hot fuel, hot oil, and hot air by the fluorinated silicone elastomer containing small amounts of polytetrafluoroethylene powder is found with amounts of as little as 0.8 part by weight of polytetrafluoroethylene powder based upon 100 parts by weight of the polydiorganosiloxane gum plus the reinforcing silica filler. When amounts of polytetrafluoroethylene powder below 0.8 are used, the improvement in retention of physical properties is not significant. As amounts of polytetrafluoroethylene powder larger than 0.8 part are used, the improvement in retention of physical properties becomes significant. The plasticity of the fluorinated silicone elastomeric composition becomes stiffer so that the composition reaches a point, at about 5 parts by weight, where it becomes too stiff to process in ordinary mills and molding equipment.

The curable fluorinated silicone elastomeric compositions of this invention are converted into elastomers by curing. The compositions as manufactured are thick pastes or putties which can be formed under pressure into the desired shapes. Curing changes the composition into a solid, nonflowing elastomer having a measurable hardness and useful physical properties such as tensile strength, elongation, tear strength, and resistance to hot fuel, hot petroleum oil and hot air. Various means of curing may be used with the compositions of this invention.

The compositions of this invention are curable with heat to form elastomers whenever they contain organic peroxide. Suitable for use are the organic peroxides that are commonly used in the silicone art such as 2,4-dichlorobenzoylperoxide, benzoylperoxide, di-tertiary-butylperoxide, 2,5-bis(tert-butylperoxy)-2,5-dimethylhexane, and dicumyl peroxide. These peroxides are commercially available, usually mixed with an inert carrier to form a powder or paste. The amount of peroxide is not narrowly critical. The composition may contain from 0.1 to 3 parts by weight of organic peroxide based upon the weight of the uncatalyzed silicone elastomer composition and be cured by heating to a temperature sufficient to activate the organic peroxide used. Since the polydiorganosiloxane gum is required to contain aliphatic unsaturation, the use of "vinyl specific" organic peroxides such as di-tertiary-butylperoxide, dicumyl peroxide, and 2,5-bis(tert-butylperoxy)-2,5-dimethylhexane is preferred. The preferred amount of organic peroxide is from 0.2 to 1 part by weight.

The compositions of this invention are curable using other known means for curing vinyl containing polydiorganosiloxane gums. The compositions may be cured by exposure to high energy radiation such as gamma radiation from a cobalt-60 source. Yet another means which is applicable involves crosslinking the polydiorganosiloxane gum with a siloxane containing SiH group in the presence of a suitable catalyst, e.g. a platinum compound or complex which is another well known method of curing vinyl containing polydiorganosiloxane gums.

The preferred method of curing is with heat, having a vinyl specific organic peroxide included in the composition.

In addition to the ingredients listed above, the curable fluorinated silicone elastomeric composition may contain additives which are known in the art, such as antioxidants, pigments, compression-set additives, heat-stability additives, acid acceptors, and the like.

Even though the fluorinated silicone elastomers are known for their retention of properties when exposed to fuels and oil, it has been found that the addition of acid acceptors improves the resistance to the effect of oils that have been heated for long periods at elevated temperatures. Suitable acid acceptor materials have been found to be finely divided alkaline earth metal oxides and hydroxides such as magnesium oxide, calcium oxide, and calcium hydroxide. Compositions containing a combination of an acid acceptor and the polytetrafluoroethylene powder provide greater improvement in resistance to hot oils than compositions containing either the polytetrafluoroethylene powder or the acid acceptors. The acid acceptors can be individual materials or combinations of materials. They are effective in amounts of less than 10 parts by weight, based on 100 parts by weight of the combination of polydiorganosiloxane gum and reinforcing silica filler, with the preferred amount being from 1 to 5 parts by weight.

A method of producing an improved fluorinated silicone elastomer composition consists essentially of mixing the required components (a), (b), (c), and optionally (d) together. Mixing can be accomplished by any suitable means such as a dough mixer, two-roll rubber mill, or Banbury mixer, such means being well known in the art. The order of mixing is not critical, but the organic peroxide, if used, is normally added last. It is most conventional to mix the silica filler into the polydiorganosiloxane gum along with the anticrepe-hardening agent, if the silica filler is being treated in situ, then add the polytetrafluoroethylene powder and any other minor ingredients, mix well, and then add the organic peroxide.

An improved fluorinated silicone elastomer is produced by mixing the fluorinated elastomeric composition detailed above, forming the composition to the desired configuration, and vulcanizing to yield a fluorinated silicone elastomer. The fluorinated silicone elastomer exhibits improved retention of physical properties after exposure to fuels, oils, and aging at elevated temperatures.

The fluorinated silicone elastomeric composition may be formed to the desired configuration by suitable methods such as compression molding, injection molding, transfer molding, calendering and extruding.

After forming to the desired configuration, the formed fluorinated silicone elastomeric composition is vulcanized. When the fluorinated silicone elastomeric composition contains organic peroxide vulcanizing agent, said composition is vulcanized by heating to a temperature sufficiently high to activate the organic peroxide catalyst. When molding, the temperature is normally from about 100° C. to 180° C. for times of 15 minutes or less. When curing in hot air, as in an extruding operation, the air temperature may be as high as 300° C. with exposure times as short as 10 to 60 seconds.

The fluorinated silicone elastomer produced following the method of this invention exhibits improved retention of physical properties after exposure to hot fuel, hot oil, and elevated temperatures. The fluorinated silicone elastomer is particularly useful in applications such as gaskets, diaphragms, and seals which are exposed to fuel, lubricating oils, and elevated temperatures such as those found in automobile engines.

The following examples serve to further illustrate the present invention and its usefulness, but should not be construed as limiting the invention which is properly delineated by the appended claims. All parts are parts by weight. Williams plasticity number was determined in accordance with ASTM D-926 using a sample weight equal to 4 times the specific gravity of the polydiorganosiloxane. The plasticity number is equal to the final sample thickness in millimeters times 100. Durometer was measured according to ASTM D-2240. Tensile strength and ultimate elongation were measured according to ASTM D-412.

EXAMPLE 1

The improvement in properties obtained by the addition of polytetrafluoroethylene powder to a heat curable fluorinated silicone elastomer composition is shown in this example.

A fluorinated silicone elastomeric base was prepared by mixing in a dough mixer 40 parts of hydroxyl endblocked poly-3,3,3-trifluoropropyl(methyl)siloxane gum (gum A), the gum having a Williams plasticity number of approximately 290, 60 parts of a hydroxyl endblocked poly-3,3,3-trifluoropropyl(methyl)(vinyl)siloxane gum (gum B) having 1 mole percent methylvinylsiloxy units, 99 mol percent 3,3,3-trifluoropropyl(methyl)siloxy units, and a Williams plasticity number of approximately 300, 58 parts of reinforcing fume silica filler having a surface area of about 250 $m^2/g$; 17 parts of hydroxyl endblocked polymethyl-3,3,3-trifluoropropylsiloxane fluid having about 6 weight percent hydroxyl groups and a viscosity of about 0.1 Pa·s as an anticrepe-hardening agent; and 1 part of hydroxyl endblocked polymethylvinylsiloxane fluid having about 4 weight percent hydroxyl groups. This mixture was mixed while heating to 170° C. for two hours to yield a homogeneous base.

A fluorinated silicone elastomeric composition (composition A) was prepared by mixing on a two-roll rubber mill 100 parts of the above base, 1 part of heat stability additive containing 50 percent by weight ceric hydrate in polydimethylsiloxane gum, and 1 part of 50% active powder of 2,5-bis(tert-butylperoxy)-2,5-dimethylhexane as the catalyst.

A similar fluorinated silicone elastomeric composition (composition B) was prepared as above, but in addition there was milled in 3 parts of polytetrafluoroethylene powder having an average particle diameter reported as 500±150 micrometers.

A portion of each composition was press molded for 10 minutes at 171° C. to form molded sheets. The molded sheets of about 2.54 mm thickness were further cured by heating in an air-circulating oven for 4 hours at 200° C.

Each sheet was cut into test pieces and tested with the results shown in Table 1.

Additional test pieces were immersed in ASTM Fuel C (50 volume percent isooctane and 50 volume percent toluene) for 24 hours at reflux temperature, then cooled in Fuel C and tested for properties. The change in properties, based on the original values, is shown in Table 1.

Additional test pieces were heated in a forced air circulating oven for the times and temperatures shown in Table 1, then tested for properties. The change in properties, based upon the original values is shown in Table 1.

The results shown in Table 1 illustrate that the initial properties are maintained or improved by the addition of the polytetrafluoroethylene powder. The addition of the polytetrafluoroethylene powder significantly improved the resistance of the cured composition to the effects of immersion in hot Fuel C and of aging in hot air.

TABLE 1

| Composition | A | B |
|---|---|---|
| Polytetrafluoroethylene, parts | None | 3 |
| Initial Properties | | |
| Plasticity, number | 434 | 691 |
| Durometer, Shore A | 76 | 76 |
| Tensile Strength, MPa | 8.44 | 8.61 |
| Elongation, percent | 220 | 240 |
| Tear Strength, "B," kN/m | 21.9 | 47.6 |
| Change after 24 hours immersion in Fuel C at reflux | | |
| Durometer, Shore A | −13 | −17 |
| Tensile Strength, percent | −30 | −10 |
| Elongation, percent | −23 | −12 |
| Volume Change, percent | +23 | +20 |
| Change after heat aging 1 day at 260° C. | | |
| Durometer, Shore A | +6 | +3 |
| Tensile Strength, percent | −35 | −10 |
| Elongation, percent | −36 | −16 |
| Change after heat aging 28 days at 210° C. | | |
| Durometer, Shore A | +9 | +4 |
| Tensile Strength, percent | −41 | −15 |
| Elongation, percent | −55 | −44 |

EXAMPLE 2

The effect of the addition of various amounts of polytetrafluoroethylene powder in a heat curable fluorinated silicone elastomer composition was determined.

A fluorinated silicone elastomer base was prepared by mixing as in Example 1, 30 parts of gum A, 70 parts of gum B, 60 parts of the reinforcing silica filler, 20 parts of the anticrepe-hardening agent, and 0.3 part of the polymethylvinylsiloxane fluid.

A series of compositions were prepared by mixing 100 parts of the above base with various amounts of the polytetrafluoroethylene powder of Example 1. The amount of powder used in each case is shown in Table 2. One part of the heat stability additive of Example 1 and 1 part of the catalyst powder of Example 1 were mixed with the base.

The compositions were then molded, cured, and tested as in Example 1. The results in Table 2 show that 1 part of polytetrafluoroethylene powder is enough to improve the original tear properties and to improve the physical properties after immersion in hot fuel or exposure to hot air.

The composition containing 2 parts of polytetrafluoroethylene powder was mixed with 1.5 parts by weight of the organic peroxide per 100 parts by weight of the base and molded into carburetor pump cups by a commercial molder for experimental testing. The pump cup passed a durability test consisting of 500,000 strokes over a seven day period, in a fuel atmosphere, in a carburetor. This successful test was repeated in 3 other carburetors. This was the first fluorinated silicone elastomer based pump cup that was known to have been able to pass this test.

TABLE 2

| Polytetrafluoroethylene, parts | None | 1 | 2 | 3 |
|---|---|---|---|---|
| Initial properties | | | | |
| Plasticity, number | 373 | 452 | 559 | 622 |
| Durometer, Shore A | 73 | 78 | 79 | 80 |
| Tensile Strength, MPa | 7.06 | 6.58 | 7.06 | 7.34 |
| Elongation, percent | 250 | 220 | 230 | 250 |
| Tear Strength, "B," kN/m | 25.2 | 29.0 | 39.6 | 45.9 |
| Change after 24 hour immersion in Fuel C at reflux | | | | |
| Durometer, Shore A | −22 | −24 | −21 | −17 |
| Tensile Strength, percent | −15 | −11 | −13 | −11 |
| Elongation, percent | −12 | −5 | −4 | −16 |
| Volume Change, percent | +22 | +21 | +19 | +22 |
| Chage after heat aging 1 day at 260° C. | | | | |
| Durometer, Shore A | +6 | +5 | +3 | +2 |
| Tensile Strength, percent | −32 | −21 | −16 | −8 |
| Elongation, percent | −56 | −45 | −43 | −48 |
| Change after heat aging 28 days at 210° C. | | | | |
| Durometer, Shore A | +12 | +8 | +5 | +2 |
| Tensile Strength, percent | −22 | −6 | 0 | +10 |
| Elongation, percent | −60 | −59 | −52 | −56 |

EXAMPLE 3

The effect of the addition of polytetrafluoroethylene powder to a heat curable fluorinated silicone elastomeric composition on the resistance to hot petroleum oil was investigated.

A fluorinated silicone elastomer base was prepared by mixing in a dough mixer 100 parts of gum B of Example 1, 9 parts of the polymethyl-3,3,3-trifluoropropylsiloxane fluid of Example 1, 5 parts of a benzene soluble organopolysiloxane having monophenylsiloxane units, dimethylsiloxane units, methylvinylsiloxane units, monomethylsiloxane units, and trimethylsiloxy units such that the fluid had a phenyl radical content of about 29.9 weight percent and a vinyl radical content of about 5.5 weight percent, and 44 parts of the reinforcing fume silica filler of Example 1. The mixture was mixed while heating to 170° C. for two hours to yield a homogeneous base.

A series of compositions were prepared to evaluate the effect of the addition of polytetrafluoroethylene powder. Composition 1 was prepared as a control by mixing 100 parts of the above base, 1 part of the heat stability additive of Example 1, and 1 part of the catalyst powder of Example 1.

Composition 2 was prepared identical to composition 1, except in addition, there was added 2 parts of the polytetrafluoroethylene of Example 1.

Composition 2 was prepared identical to composition 2, except in addition, there was added as acid acceptors 2 parts of calcium hydroxide powder and 1 part of magnesium oxide powder.

A portion of each composition was then molded and prepared into test pieces as in Example 1.

Each composition was tested for physical properties with the results as shown in Table 3.

Additional test pieces were immersed in petroleum oil, defined as ASTM #3 oil in ASTM D471, at 177° C. and exposed for 800 hours. After the immersion in hot oil, the test pieces were tested with the results as shown in Table 3.

The addition of the polytetrafluoroethylene powder to the fluorinated silicone elastomeric composition improved the retention of physical properties of the fluorinated silicone elastomers on extended exposure to hot oil. The addition of acid acceptors further improved the retention of the original properties.

TABLE 3

| Composition | 1 | 2 | 3 |
|---|---|---|---|
| Polytetrafluoroethylene, parts | None | 2 | 2 |
| Acid acceptors, parts | None | None | 3 |
| Initial Properties | | | |
| Durometer, Shore A | 79 | 80 | 83 |
| Tensile Strength, MPa | 7.82 | 8.99 | 8.68 |
| Elongation, percent | 150 | 160 | 120 |
| Compression Set, percent, 22 hr/177° C. | 22 | 18 | 41 |
| Change after 800 hours in ASTM #3 oil at 177° C. | | | |
| Durometer, Shore A | −7 | −4 | −6 |
| Tensile Strength, percent | −85 | −65 | −53 |
| Elongation, percent | −87 | −75 | −50 |

EXAMPLE 4

A series of compositions were prepared adding both an acid acceptor and polytetrafluoroethylene powder to a base.

A base was prepared by mixing as in Example 1, 95 parts of a hydroxyl endblocked poly-3,3,3-trifluoropropyl(methyl)(vinyl)siloxane gum containing approximately 0.6 mol percent methylvinylsiloxy units, about 99.4 mol percent 3,3,3-trifluoropropyl(methyl)siloxy units, and having a Williams plasticity number of approximately 280 (gum C) and 5 parts of Gum A of Example 1. The mixture of gums was combined with 40 parts of fume silica having a surface area of about 250 m$^2$/g, 7 parts of a precipitated silica aerogel having a surface area of about 300 m$^2$/g, 14 parts of the hydroxyl endblocked polymethyl-3,3,3-trifluoropropylsiloxane fluid of Example 1 as an anticrepe-hardening agent, 1 part of the hydroxyl endblocked polymethylvinylsiloxane fluid of Example 1, and 1 part of paste containing 9 percent boric acid in polymethylsiloxane gum.

Portions of this base were then compounded on a two-roll mill with the parts of polytetrafluoroethylene powder of Example 1 as shown in Table IV, and with the parts of acid acceptor shown. The acid acceptor was a finely divided magnesium oxide powder that is commercially available. Each composition was catalyzed with 1 part of the catalyst powder used in Example 1.

Each composition was molded as in Example 1, cut into test pieces and tested for original properties and again after being submerged for 168 hours in ASTM #3 oil at 177° C.

The resistance of the fluorinated silicone elastomer to exposure to hot oil is improved by the addition of the polytetrafluoroethylene powder. The acid acceptor addition also improved the hot oil resistance. Adding the polytetrafluoroethylene and the acid acceptor to the fluorinated silicone elastomeric base produced hot oil resistance that was unexpectedly superior to either one of them alone even though less of the acid acceptor was used in the combination.

TABLE 4

| Composition | A | B | C | D |
|---|---|---|---|---|
| Base, parts | 100 | 100 | 100 | 100 |
| Polytetrafluoroethylene, parts | None | None | 5 | 5 |
| Acid Acceptors, parts | None | 4 | None | 3 |
| Initial Properties | | | | |
| Durometer | 77 | 78 | 80 | 77 |
| Tensile Strength, MPa | 7.17 | 6.72 | 8.16 | 8.61 |
| Elongation, percent | 200 | 170 | 200 | 160 |
| Tear Strength, B, kN/m | 16.1 | 16.1 | — | — |
| After 168 hours at 177° C. in ASTM #3 oil | | | | |
| Durometer Change | −6 | −4 | −8 | +5 |
| Tensile Change, percent | −61 | −37 | −44 | −14 |
| Elongation Change, percent | −65 | −35 | −55 | −25 |
| Volume Change, percent | +2.8 | +3.3 | Nil | +1.9 |

EXAMPLE 5

A series of compositions were prepared adding both an acid acceptor and polytetrafluoroethylene powder to a different base than Example 4.

A base was prepared by mixing as in Example 1, 100 parts of gum C of Example 4, 17 parts of fume silica having a surface area of about 250 m$^2$/g, 5 parts of a precipitated silica aerogel having a surface area of about 300 m$^2$/g, 12 parts of the anticrepe-hardening agent of Example 4, 1 part of the hydroxyl endblocked polymethylvinylsiloxane fluid, and 1 part of the paste containing 9 percent boric acid.

Portions of this base were then compounded on a two-roll mill with the parts of polytetrafluoroethylene powder of Example 1 as shown in Table 5. The parts of acid acceptor shown in Table 5 were then mixed into the composition. The acid acceptor was a mixture of 50 percent by weight finely divided calcium oxide powder and 50 percent by weight finely divided calcium hydroxide powder. One part of a heat stability additive containing 50 percent by weight of cerric hydrate in polydimethylsiloxane gum was added, then each composition was catalyzed with 1 part of the catalyst powder of Example 1.

Each composition was molded as in Example 1, cut into test pieces and tested for original properties.

Additional test pieces were heated for 28 days at 210° C. in a circulating air oven and then tested for properties. Other test pieces were immersed in ASTM #3 oil at 177° C. for either 168 hours or 500 hours and then tested for properties. All the test property results are shown in Table 5.

These comparative results show that the addition of polytetrafluoroethylene powder to a fluorinated silicone elastomeric composition does not always increase the tensile strength, as has been suggested by the prior art, when used at the low levels found in the instant invention. The addition of the polytetrafluoroethylene powder improved the resistance to heat aging. The heat aging was further improved in the sample containing both polytetrafluoroethylene powder and acid acceptor. The addition of either polytetrafluoroethylene powder or acid acceptor improved the resistance of the fluorinated silicone elastomer to hot oil when exposed for 168 hours with the combination of both giving the best results. When the exposure period to hot oil was greatly extended to 500 hours, combining both the polytetrafluoroethylene powder and the acid acceptor in the fluorinated silicone elastomeric composition provided a result that was better than when either one alone was added, and an improvement over the control.

TABLE 5

| Composition | A | B | C | D |
|---|---|---|---|---|
| Base, parts | 100 | 100 | 100 | 100 |
| Polytetrafluoroethylene, parts | — | 2 | — | 2 |
| Acid acceptor, parts | — | — | 2 | 2 |

TABLE 5-continued

| Composition | A | B | C | D |
|---|---|---|---|---|
| Initial properties | | | | |
| Durometer | 43 | 54 | 47 | 54 |
| Tensile Strength, MPa | 7.54 | 6.13 | 6.58 | 5.82 |
| Elongation, percent | 340 | 300 | 310 | 300 |
| Compression Set, percent, 22 hr./177° C. | 12 | 14 | 20 | 20 |
| After heat aging 28 days at 210° C. | | | | |
| Durometer Change | +3 | +1 | +1 | +3 |
| Tensile Change, percent | −51 | −35 | −44 | −32 |
| Elongation Change, percent | −26 | −20 | −19 | −20 |
| After 168 hours at 177° C. in ASTM #3 oil | | | | |
| Durometer Change | −6 | −6 | −10 | −6 |
| Tensile Change, percent | −48 | −40 | −40 | −33 |
| Elongation Change, percent | −12 | −10 | −6 | Nil |
| After 500 hours at 177° C. in ASTM #3 oil | | | | |
| Durometer Change | −13 | −14 | −15 | −11 |
| Tensile Change, percent | −77 | −80 | −68 | −64 |
| Elongation Change, percent | −18 | −37 | −19 | −13 |

That which is claimed is:

1. A curable fluorinated silicone elstomeric composition consisting essentially of
   (a) 100 parts by weight of polydiorganosiloxane gum having from 45 to 50 percent of the organic radicals being 2-(perfluoroalkyl)ethyl radicals in which the perfluoroalkyl radical has from 1 to 4 inclusive carbon atoms, from 50 to 55 percent of the organic radicals being selected from the group consisting of monovalent hydrocarbon radicals having from 1 to 6 carbon atoms, from 0.1 to 1 percent of the monovalent hydrocarbon radicals having aliphatic unsaturation,
   (b) from 20 to 65 parts by weight of reinforcing silica filler having a surface area of at least 150 m²/g, said silica being treated with anticrepe-hardening agent,
   (c) from 0.8 to 5 parts by weight, based on 100 parts by weight of (a) plus (b), of polytetrafluoroethylene powder, and
   (d) sufficient means for curing to fully cure, said composition, after curing, having improved retention of physical properties after exposure to hot fuel, hot petroleum oil, and hot air.

2. The composition of claim 1 in which (d) is from 0.1 to 3.0 parts by weight, based on the weight of (a) plus (b), of an organic peroxide vulcanizing agent.

3. The composition of claim 2 in which the polydiorganosiloxane gum is a hydroxyl endblocked gum having a Williams plasticity number of greater than 250, the 2-(perfluoroalkyl)ethyl radicals are 3,3,3-trifluoropropyl radicals, the polytetrafluoroethylene powder is present in an amount of from 1 to 3 parts by weight, and the peroxide is present in an amount of from 0.2 to 1 part by weight.

4. The composition of claim 3 in which the silica filler is present in an amount of from 45 to 60 parts.

5. The composition of claim 4 in which there is also present organosilicon compound in an amount sufficient to yield from 0.075 to 0.60 part by weight vinyl radical based on 100 parts by weight of (a).

6. A curable fluorinated silicone elastomeric composition consisting essentially of
   (a) 100 parts by weight of polydiorganosiloxane gum having from 45 to 50 percent of the organic radicals being 2-(perfluoroalkyl)ethyl radicals in which the perfluoroalkyl radical has from 1 to 4 inclusive carbon atoms, from 50 to 55 percent of the organic radicals being selected from the group consisting of monovalent hydrocarbon radicals having from 1 to 6 carbon atoms, from 0.1 to 1 percent of the monovalent hydrocarbon radicals having aliphatic unsaturation,
   (b) from 20 to 65 parts by weight of reinforcing silica filler having a surface area of at least 150 m²/g, said silica being treated with anticrepe-hardening agent,
   (c) from 0.8 to 5 parts by weight, based on 100 parts by weight of (a) plus (b), of polytetrafluoroethylene powder, and
   (d) sufficient means for curing to fully cure, and
   (e) an acid acceptor selected from the group consisting of magnesium oxide, magnesium hydroxide, calcium oxide, and calcium hydroxide present in an amount of less than 10 parts by weight based upon 100 parts by weight of (a) plus (b), said composition, after curing, having improved retention of physical properties after exposure to hot fuel, hot petroleum oil, and hot air.

7. The composition of claim 6 in which the polydiorganosiloxane gum is a hydroxyl endblocked gum having a Williams plasticity number of greater than 250, the 2-(perfluoroalkyl)ethyl radicals are 3,3,3-trifluoropropyl radicals, from 0.5 to 1.0 percent of the monovalent hydrocarbon radicals are vinyl radicals; the reinforcing silica is present in an amount of from 45 to 60 parts by weight there also being from 5 to 65 parts by weight of hydroxyl endblocked polydiorganosiloxane fluid having a viscosity below 1 Pa·s at 25° C., containing 3,3,3-trifluoropropyl radicals and vinyl radicals, the vinyl radicals being present in an amount of from 0.075 to 0.60 part by weight as anticrepe-hardening agent, the polytetrafluoroethylene powder is present in an amount of from 1 to 3 parts by weight; the acid acceptor is present in an amount of from 1 to 5 parts by weight; and an organic peroxide vulcanizing agent is present in an amount from 0.2 to 1 part by weight as the means for curing, both acid acceptor and vulcanizing agent based upon 100 parts by weight of (a) plus (b).

8. A method of improving a curable fluorinated silicone elastomeric composition consisting essentially of mixing
   (a) 100 parts by weight of polydiorganosiloxane gum having from 45 to 50 percent of the organic radicals being 2-(perfluoroalkyl)ethyl radicals in which the perfluoroalkyl radical has from 1 to 4 inclusive carbon atoms, from 50 to 55 percent of the organic radicals being selected from the group consisting of monovalent hydrocarbon radicals having from 1 to 6 carbon atoms, from 0.5 to 1 percent of the monovalent hydrocarbon radicals having aliphatic unsaturation,
   (b) from 20 to 65 parts by weight of reinforcing silica filler having a surface area of at least 150 m²/g, said silica being treated with anticrepe-hardening agent, and
   (c) from 0.8 to 5 parts by weight based on the weight of (a) plus (b), of polytetrafluoroethylene powder, and
   (d) means for curing; to yield a fluorinated silicone elastomeric composition which, when cured, has improved retention of physical properties after exposure to hot fuel, hot petroleum oil, and hot air.

9. A method of producing an improved fluorinated silicone elastomer consisting essentially of
   (a) mixing the composition of claim 1
   (b) forming to the desired configuration, and
   (c) vulcanizing;
to yield a cured fluorinated silicone elastomer having improved retention of physical properties after exposure to hot fuel, hot petroleum oil and hot air.

* * * * *